United States Patent [19]

Rodriguez et al.

[11] Patent Number: 4,622,627

[45] Date of Patent: Nov. 11, 1986

[54] SWITCHING ELECTRICAL POWER SUPPLY UTILIZING MINIATURE INDUCTORS INTEGRALLY IN A PCB

[75] Inventors: Edward Rodriguez, Winchester; Alexander Estrov, Brookline, both of Mass.

[73] Assignee: Theta-J Corporation, Wakefield, Mass.

[21] Appl. No.: 580,615

[22] Filed: Feb. 16, 1984

[51] Int. Cl.$^4$ .................. H02M 5/458; H02M 3/335
[52] U.S. Cl. ..................................... 363/37; 363/21; 363/147; 361/400
[58] Field of Search .................. 363/21, 147, 37; 336/200; 361/400, 401, 402

[56] References Cited

U.S. PATENT DOCUMENTS

| 2,896,028 | 7/1959 | Mackey | 336/200 |
| 4,383,292 | 5/1983 | Onodera et al. | 363/21 |
| 4,455,545 | 6/1984 | Shelly | 336/200 |

FOREIGN PATENT DOCUMENTS

| 110424 | 8/1979 | Japan | 336/200 |

OTHER PUBLICATIONS

Miura et al., "New Power Supply for Audio Power Amplifiers," IEEE Trans. Consum. Electron. (USA), vol. CE-24, No. 3, pp. 291-299, (Aug. 1978).
Stephens et al., "Cost Effective Switched Mode Power Supplies," New Electron. (G.B.) vol. 12, No. 12, pp. 84+87, Jun. 12, 1979.
Pelly et al., "Power MOSFETs Take the Load off Switching Supply Design," Electronic Design, pp. 135-139, Feb. 17, 1983.

Primary Examiner—William H. Beha, Jr.
Attorney, Agent, or Firm—Jerry Cohen; M. Lawrence Oliverio

[57] ABSTRACT

Electrical switching power supply for microprocessors and the like comprising a high voltage d.c. source (30, 34, 32, 50) resonant circuit (38, 51, 42, 52) including a switching transistor (52) which is operated in Megahertz range and provides pulses, via a transformer (40), rectifier (56), smoothing choke (62) to a d.c. low voltage output terminal (66). The rate of switching is controlled by a pulse generator (54) which pulses variably in response to output voltage to thereby vary switching repetition rate and hold to a predetermined output voltage. The inductive elements use spirals (12A and 12A') of thin lines on the surface of a substrate board and ferrite plugs (20) passing through holes (22) in the board to provide miniature inductive elements built into the substrate for effective use in a microprocessor power supply, or the like, and in other applications. Power dissipating elements on the circuit are mounted to a common thermal ground (29) and the circuit as a whole, including such thermal ground is encapsulated to provide a plate form power supply.

10 Claims, 20 Drawing Figures

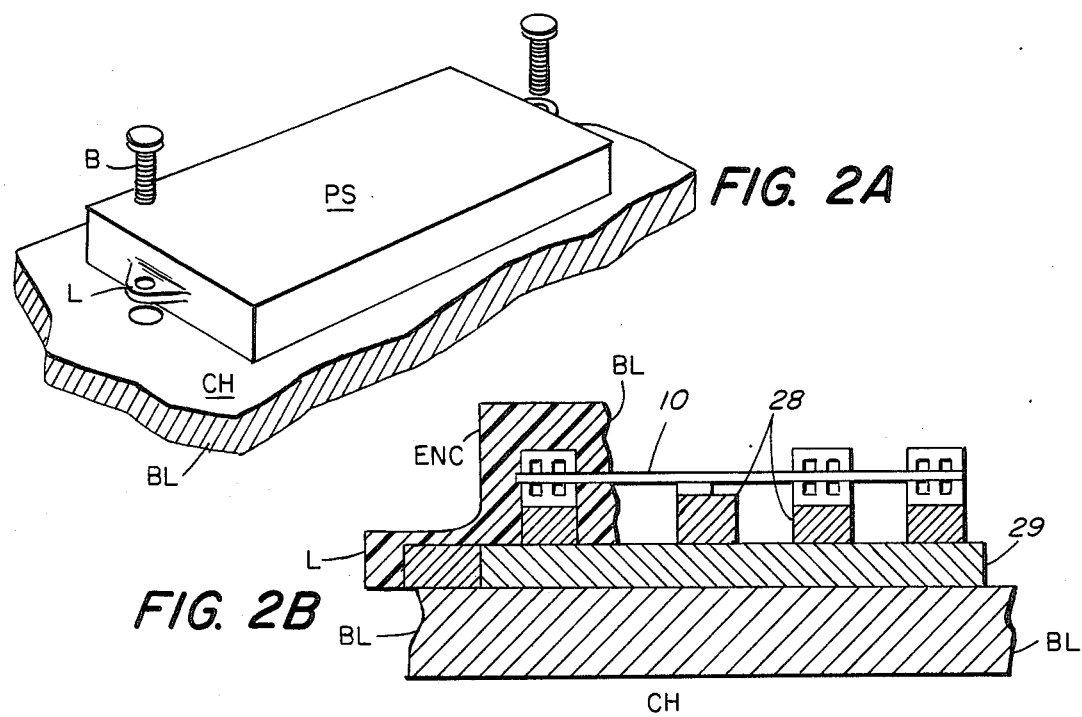
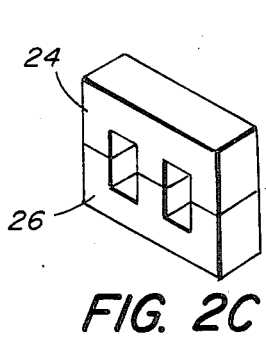
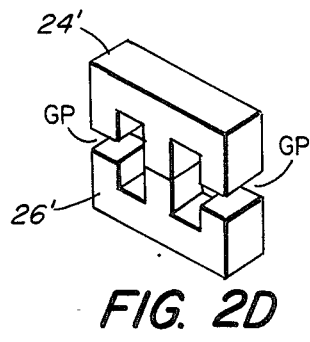
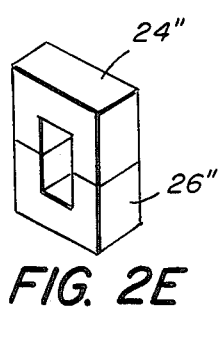
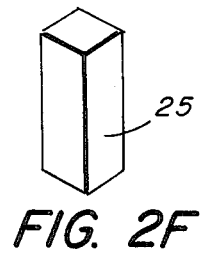
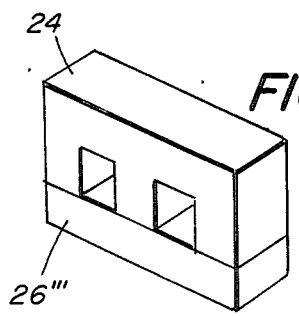
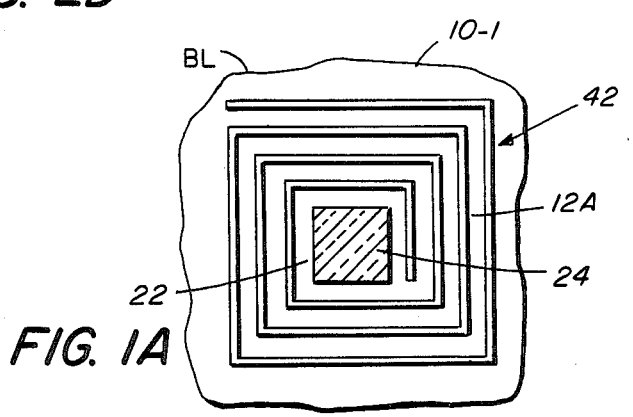
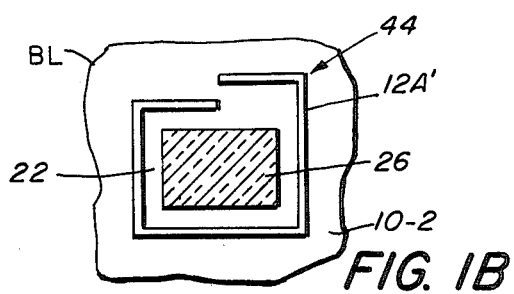
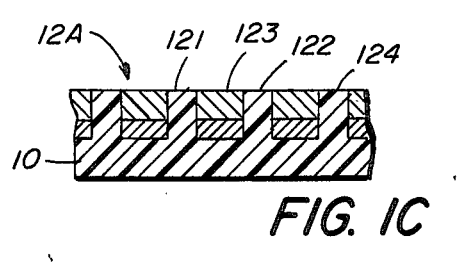

SWITCHING ELECTRICAL POWER SUPPLY UTILIZING MINIATURE INDUCTORS INTEGRALLY IN A PCB

BACKGROUND OF THE INVENTION

The present invention relates to electrical power supplies and more particularly to power supply circuits, and components, utilizable for microprocessors (e.g. office and personal microcomputers and industrial machine and laboratory instrument controllers). The invention is particularly characterized in effective utilization of miniaturized inductive components (e.g. choke coils and transformers) for the above and other purposes.

It appears that future power supplies for microprocessors and the like will contain most semiconductor components and other logic elements in integrated circuit (IC) form, as in the microprocessor, per se, supplemented by patterned arrays of resistors and capacitors on the substrate containing the IC, with few, if any, supplemental discrete components. On the other hand power handling components of such supplies are difficult to miniaturize and these limit optimization of the cost, size and convenience of the microprocessor.

It is a principal object of the invention to provide an electrical power supply for microprocessors and the like which reduces the size/cost mismatch between power supply and logic/storage elements.

It is a further object of the invention to reduce losses in such a power supply.

It is a further object of the invention to provide high reliability, minimal generation of electromagnetic interference and high wattage-per-cubic inch rating in such a power supply.

It is a further object of the invention to provide enhanced effectiveness and utilization of inductive devices in such a power supply and for other purposes.

SUMMARY OF THE INVENTION

In accordance with the invention, a switching power supply approach is utilized. A switching power supply is one in which AC power (110 or 220 volts a.c., 60 or 50 Hz) is first rectified, filtered, "chopped" at high frequencies, typically above 20 KHz, coupled through a small high frequency transformer, rectified and then filtered to provide a predetermined low voltage d.c. output, typically 5, 12, 15, 24, or 50 volts d.c.

A switching power supply, by having the principal power regulation transistor operating in an ON/OFF mode rather than in the active, or linear, region, exhibits far greater efficiency than a linear power supply. Further, the use of high frequency, rather than 60 Hertz, greatly reduces the needed size of any inductive elements of the supply.

The power supply circuit preferably includes a parallel resonant configuration operating at a resonant frequency in the 1-10 Megahertz range and incorporates a solid state switching means, preferably a switching transistor of bipolar or MOSFET form. In accordance with a further aspect of the invention active and passive elements of the power supply circuit are incorporated into a single substrate hybrid circuit board. Such elements include;

(a) resistors and interconnect paths, made by standard printed circuit metallization and metal-line-forming techniques of the printed circuit (PC) and hybrid circuit industries, using a metal covered plastic substrate board;

(b) capacitors with component layers sputtered or silk-screened directly onto the board (or into preceding component layers on the board);

(c) active devices, made separately and bonded down to the board and wire bonded to interconnect circuitry on the board;

(d) inductive elements comprising spiral cutouts of the board's metallization established, e.g., by fine line chemical or plasma (dry) etching or laser or water jet cutting, some of such inductive elements comprising transformers with spirals on the same or opposite faces of the substrate (or on faces of different substrates) magnetically coupled by ferrite plugs passing through holes in the substrate, the ferrite plugs comprising parts of closed or nearly closed magnetic paths to limit leakage. The windings may also be made as described below in connection with FIG. 1C.

In a typical embodiment, all spirals are etched as fine-line metallization patterns on a PC board. For extra small spirals, spirals can be laser cut into a copper area, with spaces under 0.002 in. readily achievable with commercially available Q-switched YAG lasers. While spiral inductors have been used extensively in prior art, they have been almost exclusively used for microwave tuning or signal transfer and for low level signal transfer. Electronics Magazine, Aug. 25, 1981, p. 113, depicts such a recent design by Analog Devices, Inc. Not evident in the prior art is the use of spiral inductances for the very efficient transfer of energy as in a power transformer at high currents in the five ampere and above range. Conventional thick and thin film technologies result in conductors whose resistance is too high or whose cross section is inadequate for power handling. The use of patterns incorporated onto a basic copper-clad printed circuit board provides high current density and fabrication repeatability at a cost far below thick or thin film, high current schemes. It an alternate embodiment, the substrate is an unmetallized plastic plate rather than a conventional copper-clad PC board. The plate can have spiral flat-bottom recesses molded into the plate with the recesses corresponding to the subsequently metallized turns. The recessed spiral areas are metallized using PC board processes commonly referred to as the additive process. The details and advantages of the additive process are known to those skilled in the art.

Metallizing the floor of the recessed spiral in this manner results in a metal spiral with adjacent turn separated by a wall corresponding to the recess depth. As a result, the metal spiral can be plated with the added metal spreading only vertically and not horizontally as if metal spirals on a conventional PC board were to be plated.

The process permits the creation of conductors whose thickness can be as much as the horizontal width, therefore enhancing the current rating of the inductive element. The ability to create vertical wall, square cross sectional, fine line conductors in this manner is, in a sense, a high current version of what is today achieved in fine line integrated circuit metallization by what is called dry-etch, or plasma, vertical-wall conductor patterns. Although, the turns of inductor components of the circuit spiral out and away from the center in the lateral plane of the substrate surface instead of vertically along the magnetic core as in a standard transformer, power transfer has been confirmed to be essentially the same between the two methods as long as the magnetic core center leg is kept to a minimum e.g., under 0.250 inches for most microprocessor power supply applications.

It is a further aspect of the invention that a power supply for a microprocessor or the like, using a switching power supply and miniaturized inductive components built into a PC substrate or the like comprises heat sinking all major thermal components, including the inductors and high loss active elements to a common thermal ground plane of massive conductive material (relative to the electrical components) which also provides a rigid mounting to the components and the power supply circuit as a whole and allows the whole power supply to be encapsulated to form a rigid block. The thermal plane member carrying the encapsulated power supply can be mounted in any orientation and tied to any convenient mounting point of a microprocessor chassis or other internal or external wall for mounting, thermal sink and electrical gound purposes. This reduces weight, volume and cost of the microprocessors or as a whole and increases mechanical and heat control design flexibility and enhances reliability of the end product.

The present invention also enhances manufacturing feasibility by reducing fragility and by reducing labor for contacting, establishing a higher degree of standardization and modularity compared to prior art power supplies of the same class and reduction of component costs.

Other objects, features and advantages will be apparent from the following detailed description of preferred embodiments thereof taken in connection with the accompanying drawing.

BRIEF DESCRIPTION OF THE DRAWING

FIGS. 1, 1A–1C, and 2,2A–2G are cross-section views of a substrate assembly bearing circuit elements of a switching power supply constructed in accordance with a preferred embodiment of the invention, FIGS. 1A–1C related to FIG. 1 and FIGS. 2A–2G related to FIG. 2 show construction details of portions of the FIGS. 1-2 embodiment.

Break lines BL appear in several figures to indicate partial showings of elements.

DETAILED DESCRIPTION OF PREFERRED EMBODIMENTS

The construction of a power supply in accordance with a preferred embodiment of the invention is carried out as follows (referring to FIGS. 1–2): a plastic or ceramic printed circuit board or substrate is coated on one or both sides, by a copper layer 12 in a thickness of 0.001 to 0.005 inches. Portions of the conductive coating are removed by etching or cutting to define inductive spirals 12A, 12A' and conductive paths, and bases 12B for components on the face(s) of the planar form substrate. Discrete components can be added by bonding a direct fabrication—e.g. a transistor 14 bonded to the board and a capacitor 16 fabricated by building up dielectric and counter-electrode layers by overcoating. The substrate 10 can be divided into plural boards as indicated at 10-1 and 10-2.

Resistors and supplemental metalization paths can be provided on the substrate face by thick film technology using pastes of conductive particles mixed with coating and bondenhancing powders, the mixture being sinterable at temperatures within limits of tolerance of the substrate 10 (e.g., between 150 deg. C. and 200 deg. C., for polyimide substrates or between 500–1100 deg. C. for ceramic substrates) to form coherent, well bonded circuit elements with the necessary electrical properties. The capacitors can be made by sputtering, vacuum deposition, or other per se well known techniques affording thick single or multi-layer coatings. Barium titanate is a preferred dielectric for capacitor elements. Semiconductive chip bonding is done by conventional means. Wires 18 are wire bonded to these and other components to complete electrical circuit paths.

Figure 1:
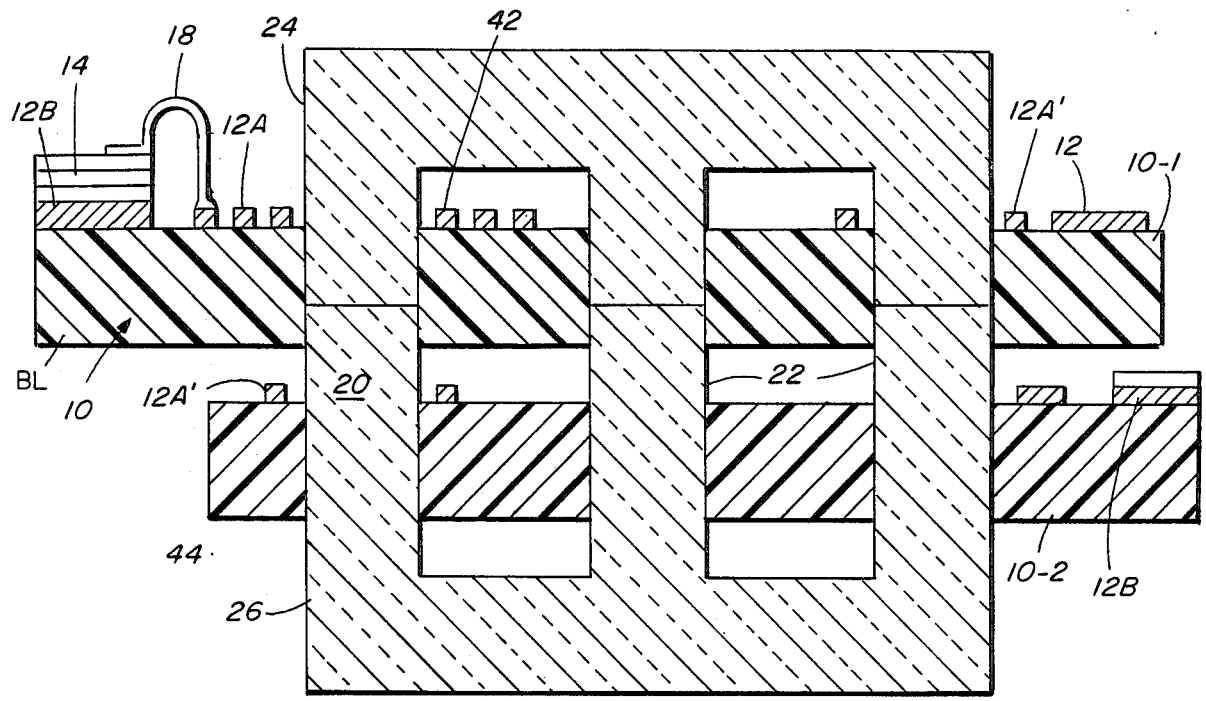

Magnetic coupling is provided by ferrite plugs, shown e.g. at 20 in FIG. 1 passing through a corresponding hole 22 in the substrate and acting as a core for a transformer formed between windings 12A and 12A'. The plug 20 can be part of an E-form ferrite core 24, matchable at its ends by a corresponding E-form ferrite core 26 to constitute when assembled a complete closed magnetic path with one or more, or all, the plugs 20 passing through holes such as 22 (in FIG. 1) in one or more substrates 10.

The major power dissipation components of the power supply such as the inductors and certain of the active elements are bonded in good heat transfer relationship to metal (preferably copper) heat sink posts 28. These are in turn bonded to a metal plate (preferably copper) which provides a common thermal ground for all such components and a secure mounting therefor. The PC substrate board, posts 28 and plate 29 comprise a harness with high resistance to vibration. The plate 29 can be mounted to a portion of the housing of the end product (e.g., a microprocessor or the like) incorporating the supply. For example, a chassis wall, indicated at CH which may be horizontal, vertical or any other orientation, can support the plate 29 and thereby support the whole power supply. The power supply can be potted in an encapsulating plastic indicated at ENC to add to its rigidity, invulnerability to vibration or disturbance in handling for original manufacture or maintenance of nearby parts, and ease of handling. Potting is made feasible by the miniaturization provided through this invention, as well as high efficiency and removal of heat from all likely sources via posts 28, achieved through the invention.

FIGS. 1A and 1B show that the windings 12A and 12A' correspond to primary and secondary windings of a voltage step down transformer on copper faced substrates 10-1 and 10-2, respectively. There is also a further secondary winding at 12A'. The windings are spirals winding from inside to out and may be of generally square, rectangular, circular, elliptical or other form. The cross section of a winding is typically rectangular with a 2 mil. height and 5 mil. width. The windings are designed to be limited to less than fifty turns, preferably less than twenty. FIG. 1C shows a preferred construction detail for making windings 12A (or 12A') wherein the plastic substrate of board 10 has molded or cut recesses 121 therein which are initially partially filled with metal layers 122 deposited by, e.g. electroless "additive" processing and overplated electrolytically to produce layers 123 which inherently deposit only in a vertical accummulation in the grooves 121 not on the outer surfaces of the substrate (because the layer 122 is an "electrode" for deposition. Thus provides an effective, economical method assuring ease of production of high current carrying capacity spiral windings of adequate cross-section with sufficient isolation of adjacent turns.

It will be appreciated that some of the windings can be on lower faces of the substrates, if convenient to the circuit designer.

Figure 2:
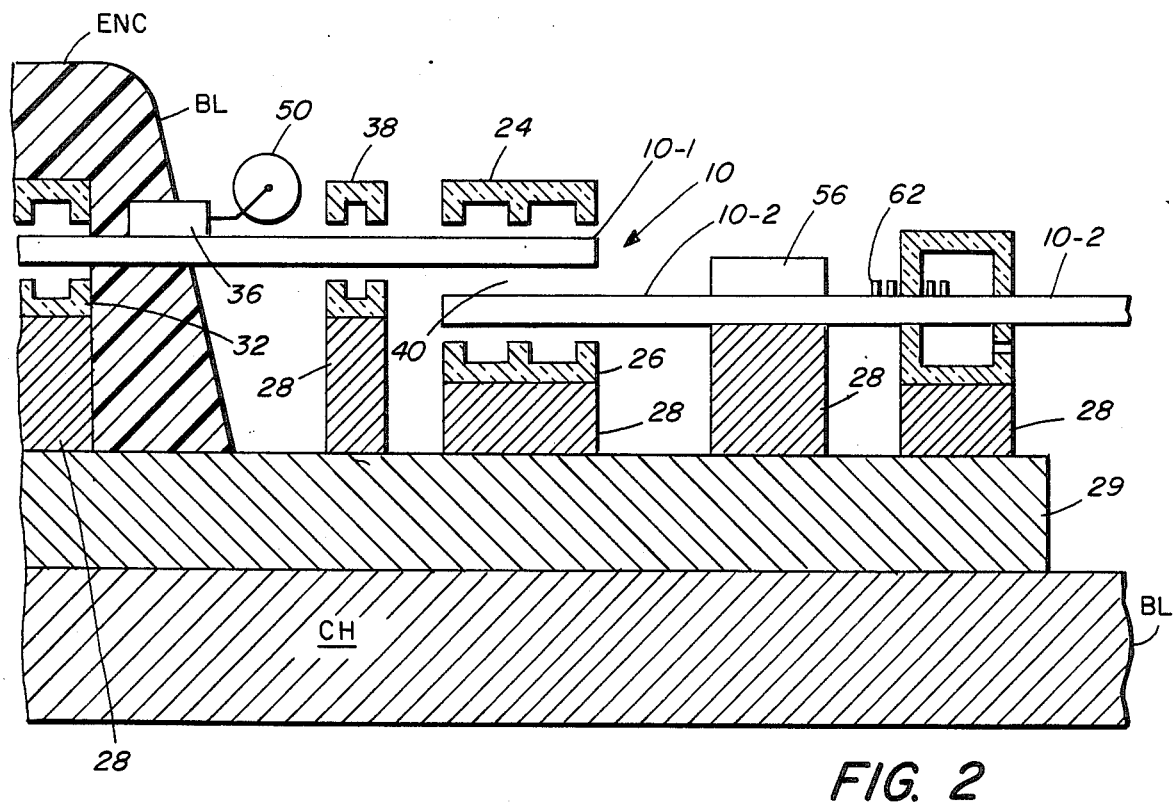

FIG. 2A shows, in isometric, and FIG. 2B shows in crosssection, a complete power supply PS, comprising the encapsulated assembly shown in FIGS. 1–2 mounted to a chassis plate portion CH via bolts B passing through holes in lugs L which are extensions of the plastic or metal plate portions of the power supply, preferably extensions of the metal plate 29.

FIGS. 2C–2G show, in isometric, various configurations of the magnetic cores including the matched E-forms 24, 26 and closed loop thereby of FIG. 2; the gaps GP provided by E-forms 24' and 26' in FIG. 2D, C-forms 24" and 26" in FIG. 2E; and I-form core 25 in FIG. 2F (less preferred but usable in some applications); and a matched E-form 24 and I-form of closure 26''' in FIG. 2G.

Where minimal gaps GP are used at all it is only for the purpose of tailoring inductance. Gernally, magnetic flux leakage should be entirely suppressed.

Figure 3:
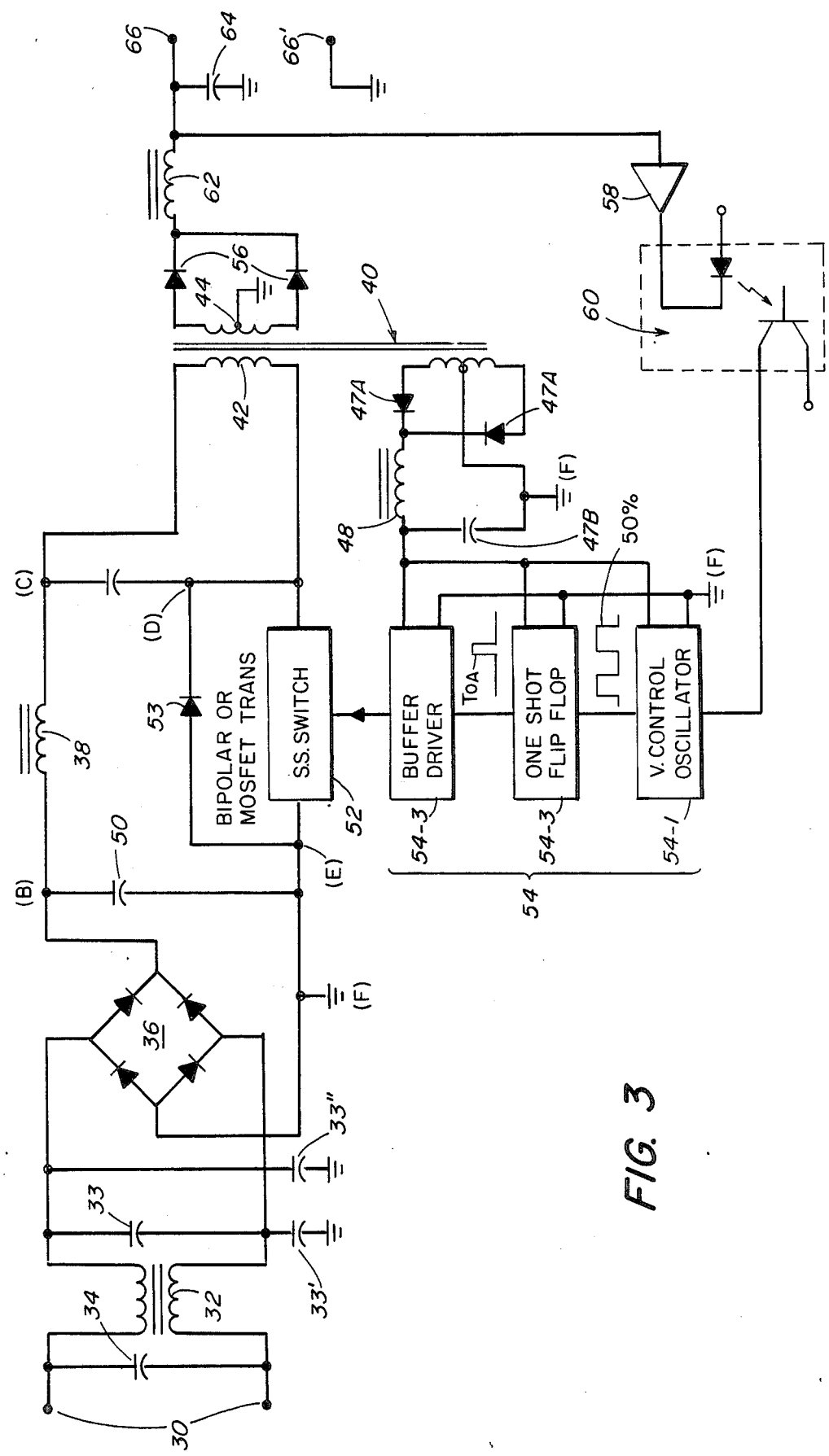
FIGS. 3, 3A–3E and 4, and 4A respectively a circuit and block diagram of an electrical switching power supply made in accordance with such embodiment, utilizing the construction features indicated in FIGS. 1-2, and FIGS. 3A–3E are Vor I vs. time traces of typical waveforms at nodes or other circuit portions A–E indicated in the FIG. 3 circuit.

The circuit of FIG. 3, containing the foregoing and like components—for purposes of acting as a power supply for personal and business computers, and like microprocessor assemblies, comprises terminals 30 to house power, an electromagnetic interference suppression transformer 32, capacitors 33 and 34 and supplemental filter capacitors 33' and 33", a solid state bridge rectifier 36 typically using 400 volt diodes, a twenty microhenries inductor 38 (forming part of a parallel resonant circuit), a main power transformer (one millihenry primary) comprising windings 42, 44 and 46 (the latter having filter components including a diode 47A, a capacitor 47B and a smoothing choke winding 48), capacitor 50 (100 microfarads, 200 volts) and 51, (1000 picofarads, 500 volts) a switching transistor 52, with its base drive controlled by a controller 54, which is essentially a square wave pulse generator responsive to output voltage to vary pulse interval, a reverse switch diode 53, an amplifier 58, an opto coupler 60, an output smoothing choke 62 (8 microhenries) an capacitor 64, terminating in a 5 volt output (D.C.) terminal 66 with a corresponding ground terminal 66'.

Figure 3A:
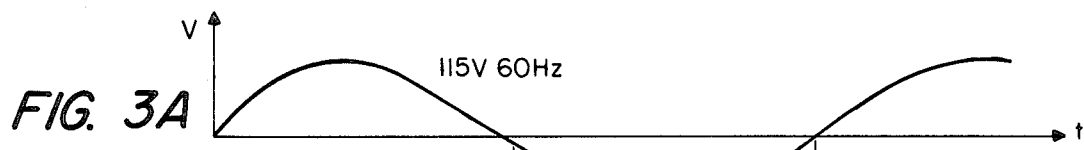
Figure 3B:
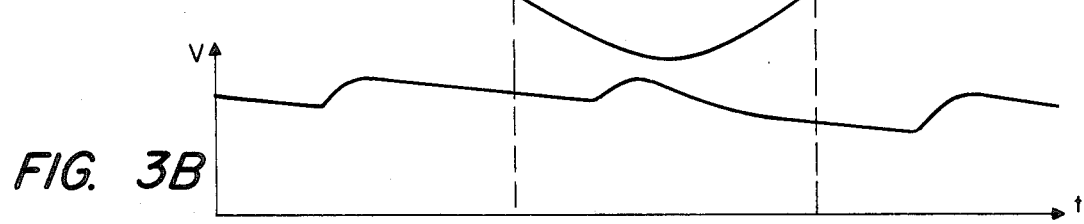
Figure 3C:
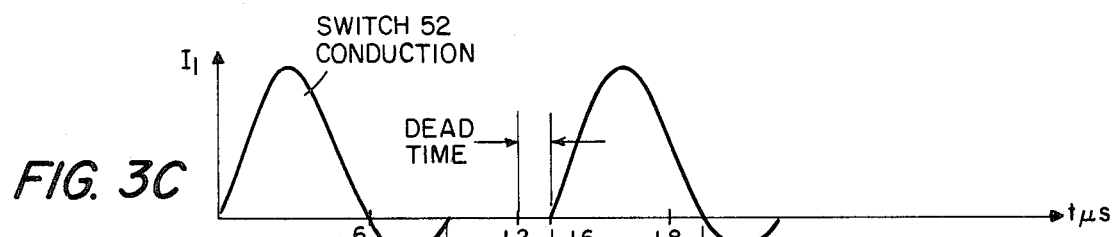
Figure 3D:
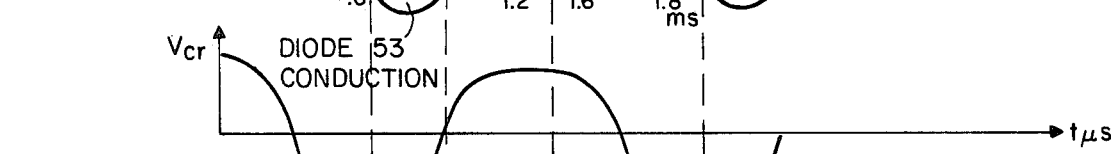
Figure 3D:
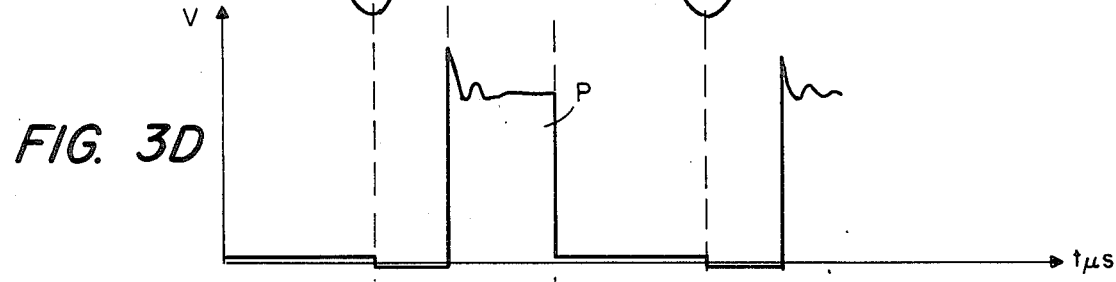
Figure 3E:
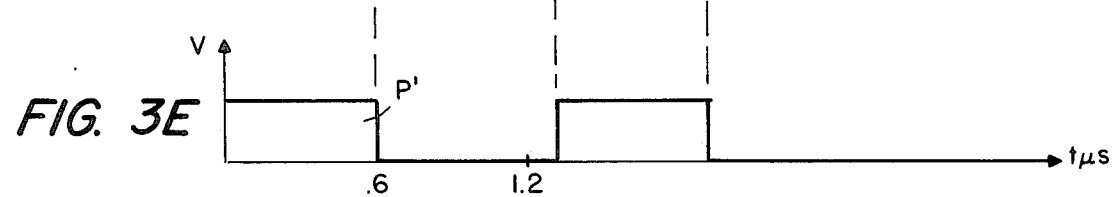
Figure 4:
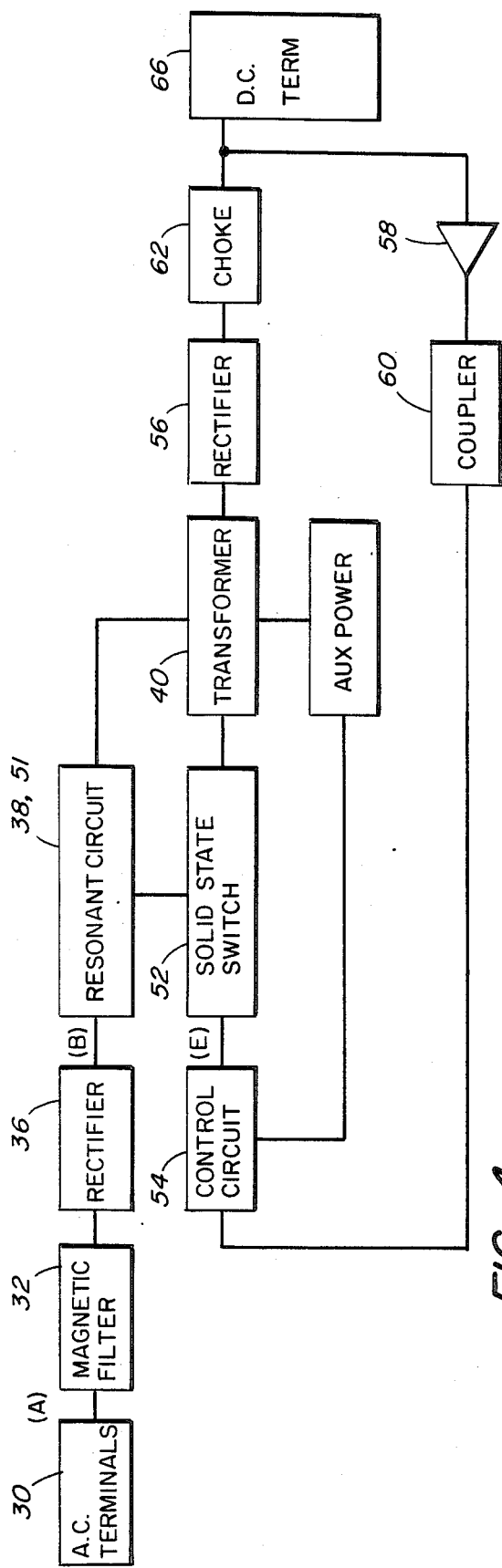
Figure 4A:
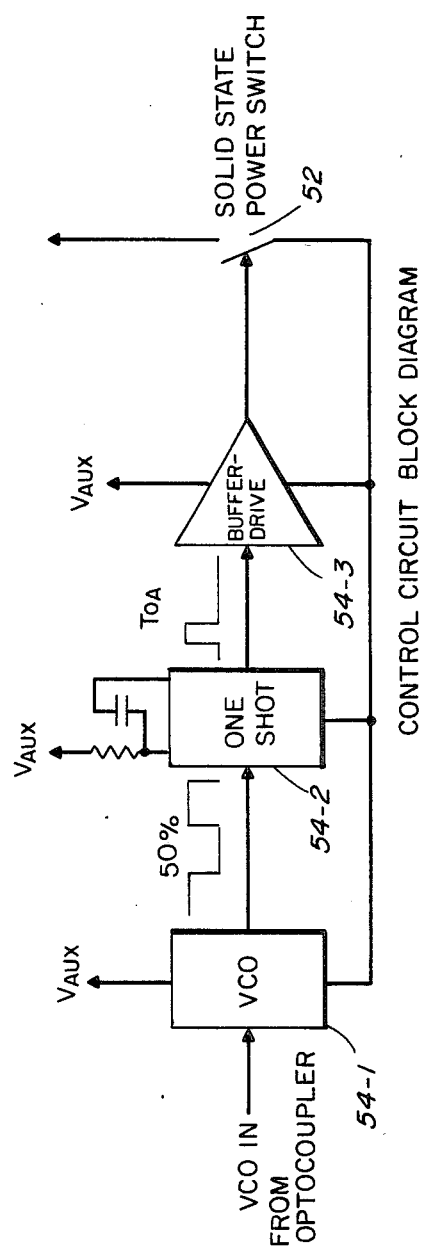

The same circuit's major elements are indicated in block diagram form in FIG. 4 for purposes of explaining operation. It comprises the A.C. terminals 30, a magnetic filter 32 (the electromagnetic interference suppression transformer), a rectifier 36, a resonant circuit comprising the coil 38 and capacitor 51, transformer 40, solid state switch 52 with base drive controlled through control circuit 54, rectifier 56, choke 62, output terminals 66, amplifier 58, and optocoupler 60. The waveforms of FIGS. 3A–3E found at certain points (A)–(E) in FIGS. 3 and 4 should now be noted.

FIG. 3A shows the sinusoidal form of the voltage-time trace of input power at 60 cycles (8 ms half cycle) and FIG. 3B shows the rectified and moderately smoothed form of such voltage-time trace at (B). FIGS. 3C and 3C' (in microseconds) show current I through and voltage V across the resonant capacitor 51 comprising a sine wave of transfer primary current with resonant peaking of current followed by a damped ringing decay at node (C) of the circuit, with a low VI product throughout, established by alternate conduction through a solid state (5.5) switching transistor 52 (of bipolar or MOSFET type) and back conduction via diode 53. It should be noted here that resonant capacitor 51 is on the primary side of the power transformer. Those skilled in the art would recognize that a comparable resonance effect could be achieved by placing the capacitor on the secondary side. On the secondary side, however, the capacitor, while potentially of a much lower voltage rating, would be conducting peak currents much greater, in proportion to the transformer turn ratio. The increased current would result in greater capacitor dissipation effects. Consequently, the preferred embodiment uses a primary side high voltage capacitor whereby conducted currents and resultant dissipation are less.

The low V-I product at the switch 52 reduces switching interval power dissipation to nearly zero.

FIGS. 3D and 3E show the resultant voltage pulses P and P' created at D and E.

Referring now to FIG. 3 it is shown that voltage pulses produced at switch 52 are passed via transformer 40 to a secondary circuit at lower voltage (17:1 step down) and correspondingly high current, rectified via Schottky diodes 56, smoothed by choke 62 and capacitor 64. The voltage is sensed and transmitted back via amplifier 58 and optocoupler 60 (comprising a light-emitting diode and phototransistor) to activate a voltage control oscillator element 54-1 of controller 54. This in turn drives a one-shot flip-flop device 54-2 which provides a base drive triggering signal via buffer-driver element 54-3 to switch 52 which may be a bipolar or MOSFET transistor. Control 54 usually (but not necessarily) comprises MOSFET circuitry in its per se known elements. An auxiliary power supply establishing voltage (Vaux) and current for control 54 is made up of transformer 40, secondary winding 46, rectifier 47A and filtering components 47B and 48.

The voltage feedback determined repetition rate for the switching transistor 52.

In this power supply an operating frequency of at least 1.0 MHz is used, as opposed to the typical 20–100 KHz of prior art, so as to sharply reduce the size of magnetic elements as well as output filter and other capacitors.

Use of a resonant circuit involves the pulsing on of the main switching transistor, 52, after which 52 "rings" off. A bipolar transistor may be used as a switch even though the frequency, above 1 MHz, is at a level generally assumed to be well above the bipolar limit (see e.g. "Switching Power Supplies" EDN Magazine, Oct. 13, 1983, p. 1138 and "Power Supplies-Special Report" Electronic Engineering Times, Sept. 26, 1983, p. 84). These references show the industry assumption that above 100–250 KHz, power MOSFET'S are required as a switch since bipolar devices have speed limitations due to storage charge effects.

In an embodiment using a bipolar transistor, however, base drive is initially caused by the control circuit 54 to be at a high level. Base drive is then dropped to a lower level soon after transistor turn on. Upon "ring-off" collector current drops to zero, base drive is caused to drop to zero by a synchronized decay of base drive and the resultant storage time necessarily approaches zero. Also, because the device has negligible storage time at turnoff, it acts like a majority carrier device (such as a MOSFET) with the attendant very high frequency capability. Unlike the power MOSFETS, however, the bipolar device has far less parasitic capacitance to interfere with the tuned collector resonant circuit. Furthermore, the transistor, unlike the SCR's used in prior art resonant converters, do not experience dv/dt latch-up problems. The bipolar device is driven at high frequency at a high speed, low voltage power MOSFET stage 54-3 in control circuit 54. The result is a combination of bipolar and power MOS device to manifest the best of both in a very high frequency, low loss, RFI reducing circuit. The arrangement has the added benefit in that the high voltage switching device, being bipolar, can achieve a level of volt/ampere rating in a smaller and less expensive chip size than an equivalently rated MOSFET. Because of the very high frequencies involved, all inductors have very few turns, typically under 30 turns.

While use of a bipolar transistor 52 is the embodiment principally described above, a power MOSFET can be substituted with the provision that a high speed diode be placed in series with the MOSFET. The small diode capacitance, in series with the MOSFET capacitance, reduces equivalent circuit capacitance to a level having minimal effect on the tuned resonant circuit.

The MOSFET approach, while less economical then the bipolar approach, does offer the potential for operation well above 1 Megahertz. At 1-2 MHz even the minimized storage time effects of the bipolar device become relevant. Going much higher with a MOSFET (e.g., 2-3 MHz) avoids this.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Electrical power supply comprising, in combination:
   (a) means for converting a line a.c. to d.c. and applying a resonant pulsation thereto at an operating frequency of at least 1.0 megahertz,
   (b) means defining a transformer with primary and secondary windings formed on surface areas of printed circuit board (PCB) means with inductive coupling material passing through the PCB substrate at primary and secondary winding locations thereon, such material forming an essentially closed magnetic loop outside the PCB, the primary and secondary winding turn ratio being selected to provide voltage step-down, current step-up,
   (c) means for applying said resonant pulsed d.c. to a transformer primary winding and applying a transformer secondary winding's induced pulse current to output terminals via rectifier and filter means, as a low voltage d.c.,
   (d) said resonant circuit means comprising switching means therein to control the pulsed current applied to the primary winding of the transformer,
   (e) voltage feedback means connected from the transformer secondary circuit to said resonant pulsation control switch to control pulsation,
   and (f) means for establishing a common thermal plane of the heat generating components of said power supply including at least the magnetic loop defining means of said transformer.

2. Electrical power supply in accordance with claim 1 wherein the primary winding of the transformer comprises less than fifty turns with the cross section of each turn being of sharp cornered rectangular form within a recess of the PCB substrate.

3. The power supply of claim 1 wherein said switch is a solid state gated switch selected from the group consisting of bipolar and MOSFET-transistors, the said voltage feedback comprises an optical coupler connected to transmit the transformer means secondary voltage to operate switch driver means via a voltage controlled oscillator to produce a pulsing on and ringing off mode of switch operation.

4. The power supply of claim 3 wherein a MOSFET switch is used as said switching element.

5. An electrical power supply in accordance with claim 1 wherein the switching transistor is a bipolar transistor.

6. An electrical power supply in accordance with claim 1 wherein the switching transistor is a MOSFET transistor.

7. Electrical power supply in accordance with claim 6 wherein the system is constructed and arranged so that the operating frequency is at least 2.0 megahertz.

8. A switching power supply in accordance with claim 1 constructed and arranged to establish phase separation of voltage and current transitions at the transistor switch thereby reducing switching-interval dissipation to essentially zero.

9. A switching power supply in accordance with claim 1 wherein said inductive elements comprise spiral metallizations capable of carrying multiple ampere currents on at least one surface of the substrate.

10. A switching power supply in accordance with claim 9 wherein the substrate is of planar form and such spirals are provided on both surfaces of the substrate, opposite spirals being connected by ferromagnetic core elements passing through the spiral.

* * * * *